United States Patent [19]

Hemmerle

[11] Patent Number: 5,185,951
[45] Date of Patent: Feb. 16, 1993

[54] OUT-ROVER LURE
[76] Inventor: Clayton Hemmerle, 116 NE. 16 Ct., Fort Lauderdale, Fla. 33305
[21] Appl. No.: 774,343
[22] Filed: Oct. 10, 1991
[51] Int. Cl.5 .............................................. A01K 95/00
[52] U.S. Cl. .................................................. 43/43.13
[58] Field of Search ....................................... 43/43.13
[56] References Cited
U.S. PATENT DOCUMENTS

| D. 189,00c | | Foster . | |
|---|---|---|---|
| 1,320,804 | 11/1919 | Squarebriggs | 43/43.13 |
| 1,606,240 | 11/1926 | Klaserner | 43/43.13 |
| 2,605,577 | 8/1952 | Waugler . | |
| 2,843,966 | 7/1958 | Ingram | 43/43.13 |
| 2,883,787 | 4/1959 | Pahl | 43/43.13 |
| 3,181,266 | 5/1965 | Leufvenius . | |
| 3,401,483 | 9/1968 | Bellah | 43/43.13 |
| 3,570,167 | 3/1971 | Smith | 43/43.13 |
| 3,748,775 | 7/1973 | Wagner . | |
| 3,813,809 | 6/1974 | Frotiee | 43/43.13 |
| 3,818,624 | 6/1974 | Duffy . | |
| 4,161,841 | 7/1979 | Holstein | 43/43.13 |

Primary Examiner—Kurt C. Rowan
Attorney, Agent, or Firm—Cushman, Darby & Cushman

[57] ABSTRACT

A device is provided which will act as a lure or teaser to attract fish and which will carry and guide the hook and bait laterally away from the boat when being pulled in the same manner as trolling, to separate fishing lines in the same fashion as out-riggers but with much greater distance. The device is lightweight and is configured and preferably weighted to remain at a steady, level course while minimizing tension and drag on the fishing line.

16 Claims, 5 Drawing Sheets

OUT-ROVER LURE

BACKGROUND OF THE INVENTION

1. Field of the Invention

The present invention relates to a device for supporting and guiding a fishing hook and bait and for luring fish, particularly during trolling.

2. Description of the Related Art

Outrigging attachments and trolling floats are used in fishing so that multiple lines can be used during trolling without the lines becoming tangled. Outriggers may also be used so that one or more lines can be maintained offset with respect to the towing vessel to increase the surface area being fished, eliminate the need for tending the fishing line at all times and to the space the various fishing lines from the boat's wake and any prop turbulence. Thus, such devices ensure the lines will be maintained in a desired spaced relation from the boat and one another. To be advantageous, guiding devices of this type must remain at a steady, level course in relation to the boat towing the same, must be light weight and must be configured to minimize tension and drag on the fishing line to which it is attached.

SUMMARY OF THE INVENTION

It is an object of the invention to provide a device which will act as a lure or teaser to attract fish. However, the inventive device is primarily designed to carry and guide the hook and bait laterally away from the boat when being pulled in the same manner as trolling and to separate fishing lines in the same fashion as outriggers but with much greater distance.

Thus, it is a primary object of the invention to provide a lightweight device for guiding a fishing line on a steady, level course and which is configured to minimize tension and drag on the fishing line.

To achieve the foregoing and other objects in accordance with the invention, the out-rover includes a main body having a longitudinal axis, a leading end and a trailing end. First and second wing elements extend laterally from the main body. A main keel element is provided which is preferably defined in a plane which is parallel to the longitudinal axis of the main body and extends downwardly from the main body. Where a single keel is provided, the longitudinal axis of the main body is most preferably defined in the vertical plane of the keel. A rudder element extends downwardly from the trailing end portion of the main body. The rudder element is defined in a plane which intersects the longitudinal axis of the main body and is defined an angle of greater than 0° with respect to that longitudinal axis so as to steer or guide the main body to the left or to the right of a boat towing the same, out of and away from the wake of the boat.

The out-rover can be provided as a pair, one with a left rudder and one with a right rudder so as to carry and guide two fishing lines respectively to the port and starboard sides of the boat. In the alternative, the right or left out-rover can be selected depending upon the proximity of the boat to shore or other obstacles which may encounter the fishing line.

In accordance with the preferred embodiment, weights are advantageously incorporated in the body of the out-rover to counterbalance the forces imposed on the rover during towing.

Other objects, features and characteristics of the present invention, as well as the methods of operation and functions of the related elements of the structure, and the combination of parts and economics of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE PRESENTLY PREFERRED EXEMPLARY EMBODIMENTS

Figure 1:
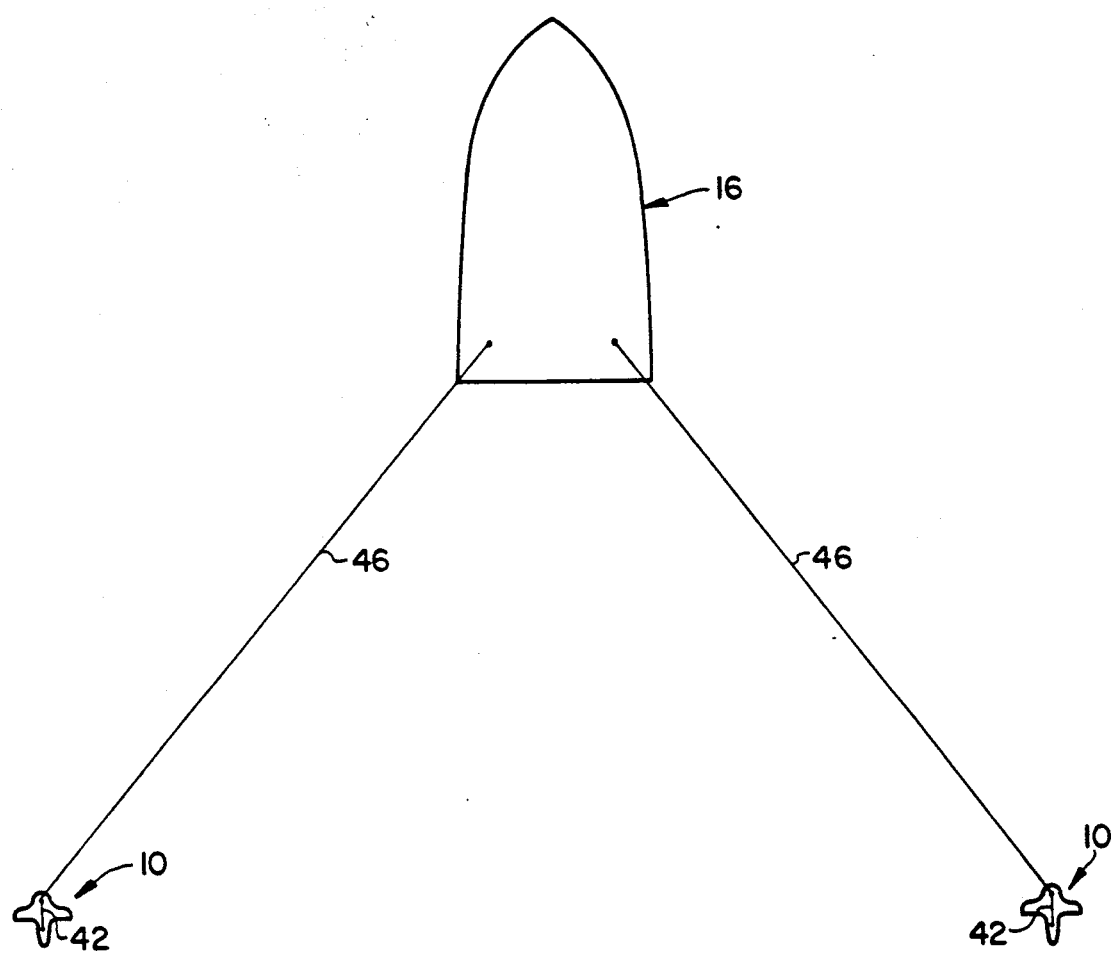
FIG. 1 is a top plan view showing a right and a left out-rover device in accordance with the invention being pulled by a fishing boat.
Figure 2:
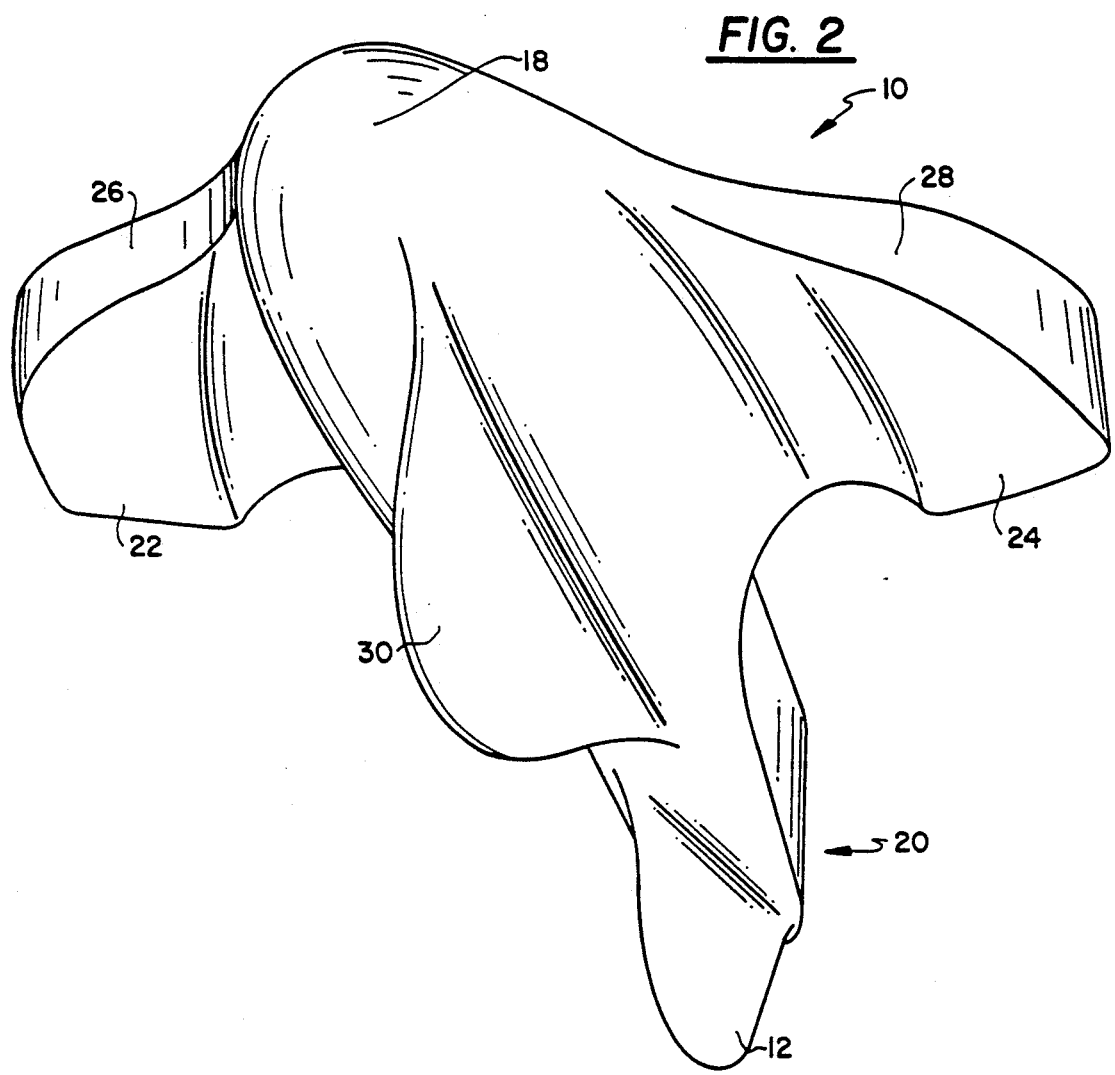
FIG. 2 is a perspective view from below of a left out-rover provided in accordance with the invention.
Figure 3:
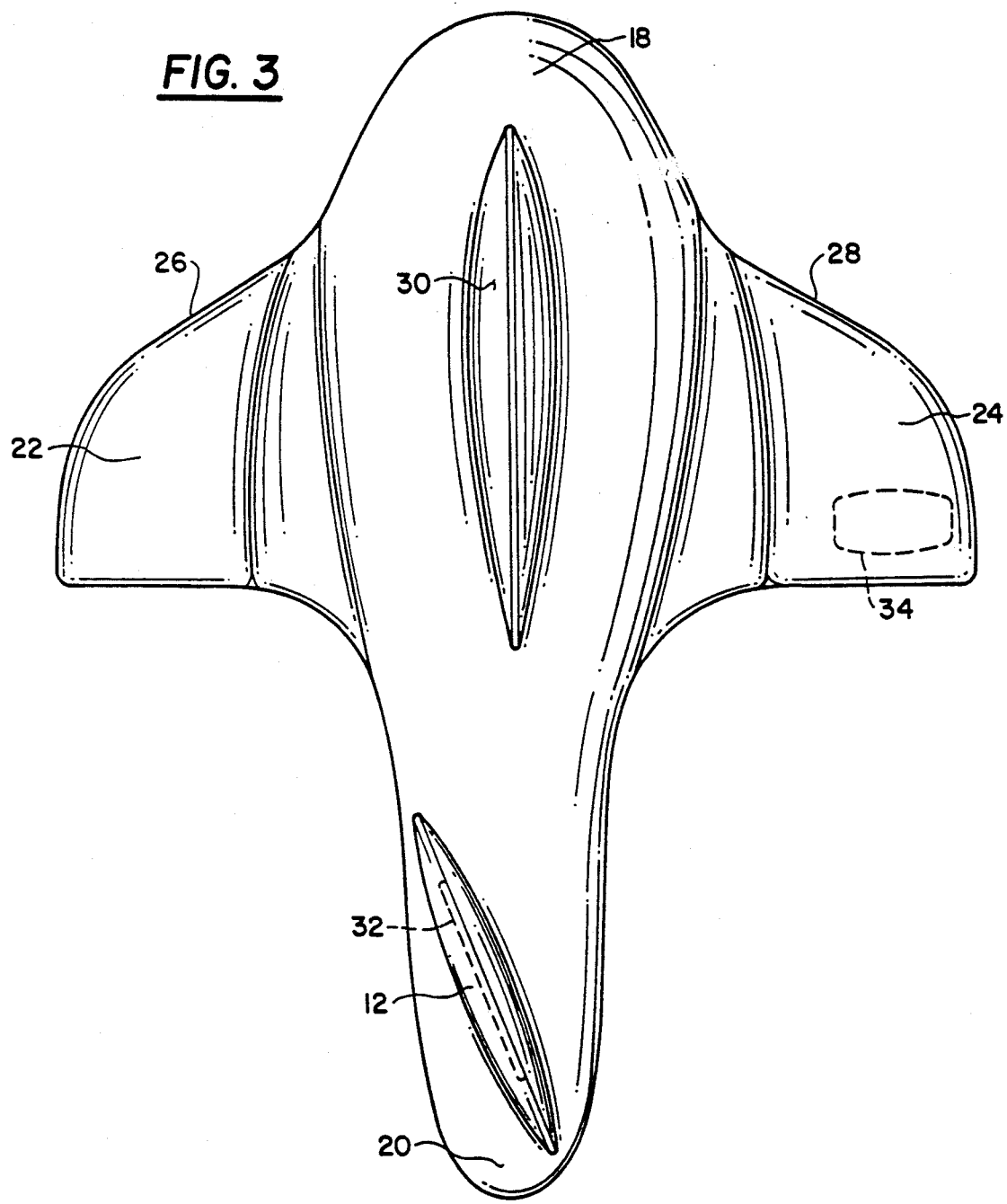
FIG. 3 is a bottom plan view of a left out-rover in accordance with the invention.
Figure 4:
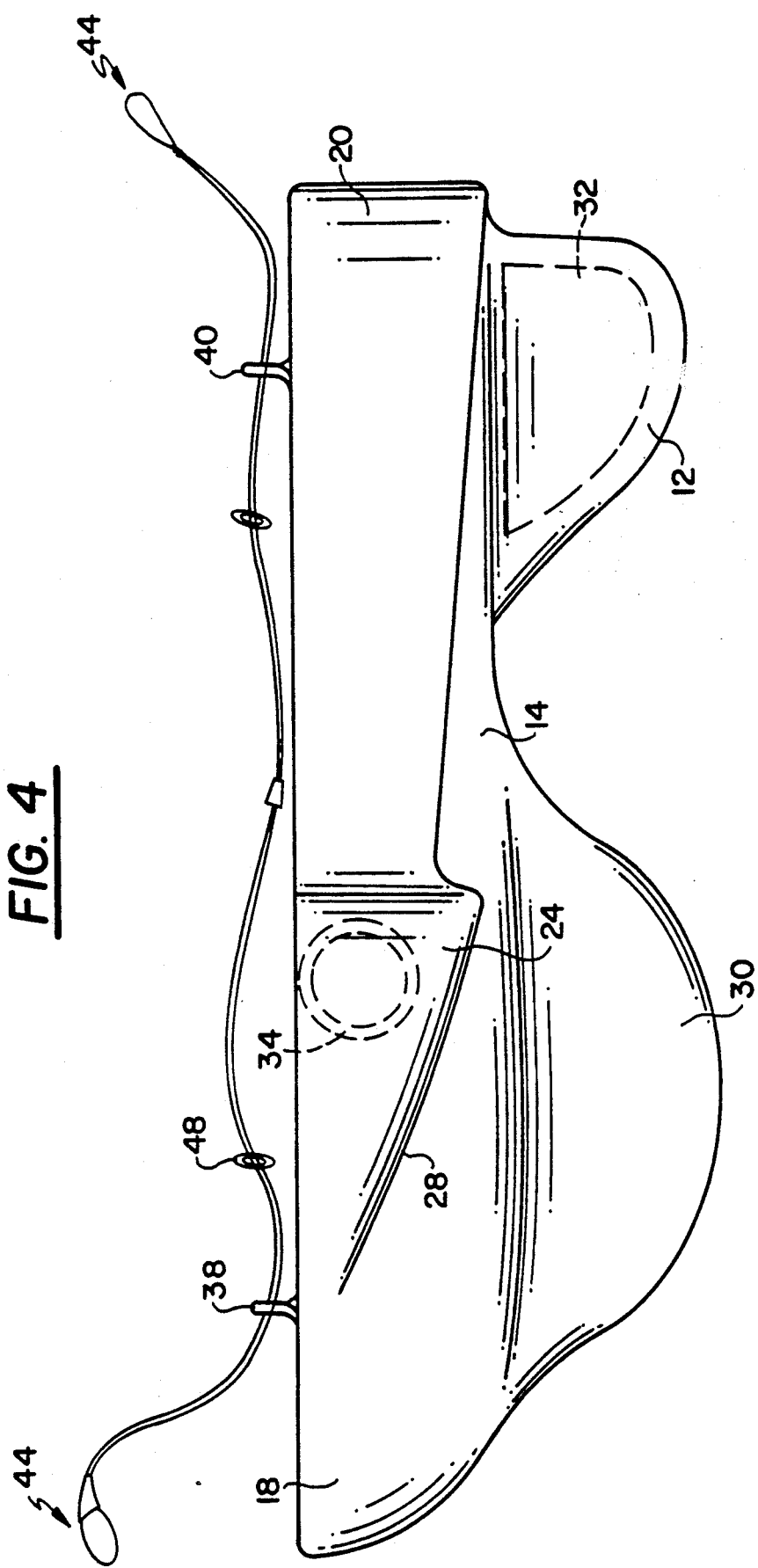
FIG. 4 is a side elevational view of a left out-rover.
Figure 5:
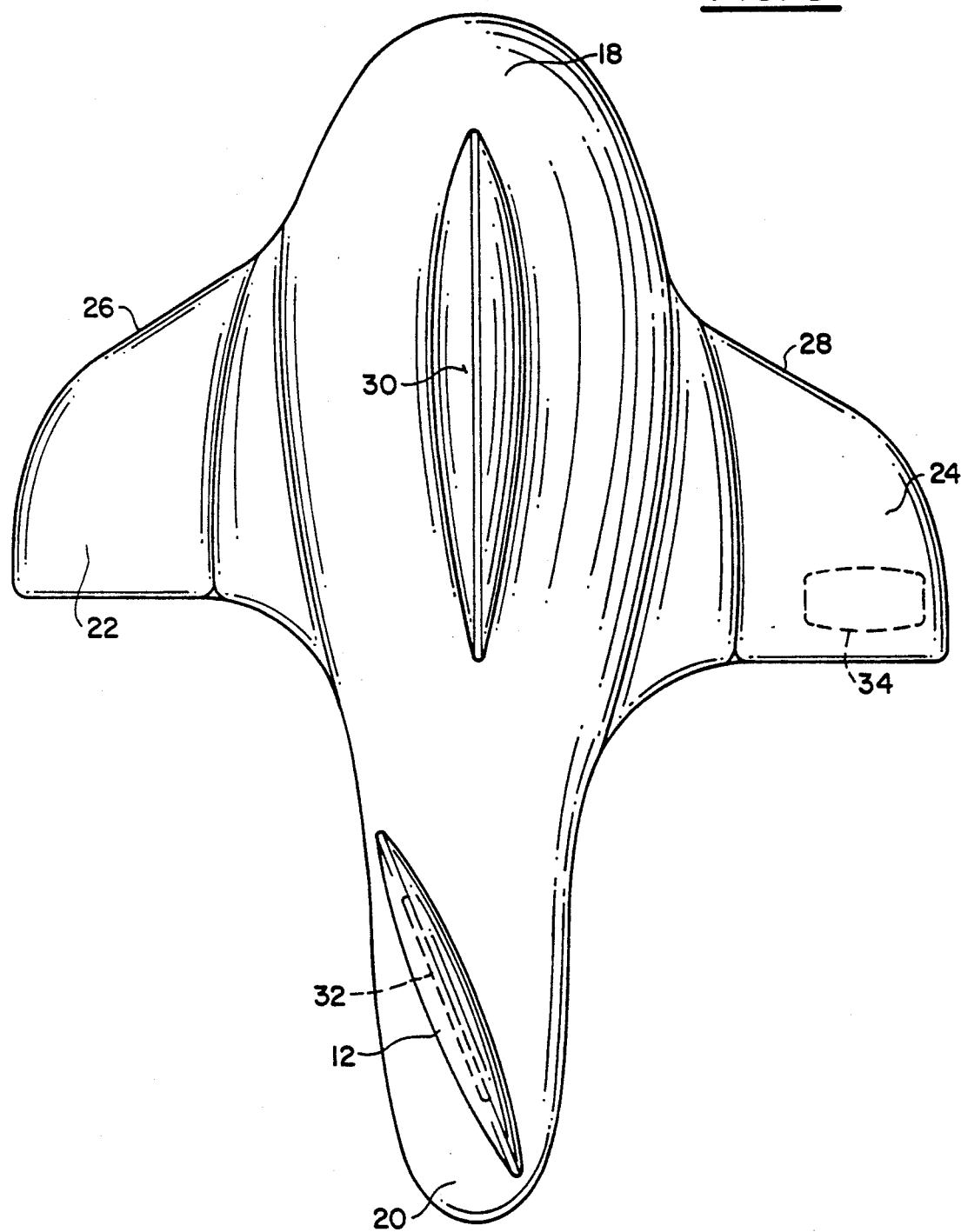
FIG. 5 is a bottom plan view of an alternate embodiment of a left out-rover in accordance with the invention.

As shown, in particular, in FIGS. 1, 2 and 3, the out-rover device 10 of the invention is hydrodynamically shaped and has a rudder element 12 which is inclined with respect to the longitudinal axis of the main body 14 of the out-rover device 10. Thus, when the out-rover 10 is towed by a boat 16, as shown in FIG. 1, the inclined rudder 12 will smoothly guide the out-rover 10 to the right or starboard side of the boat 16 or to the left or port side of the boat 16 depending upon the direction of inclination of the rudder. Because a keel is provided, a rudder inclined to the right, as shown, steers the out-rover to the left and thus is referred to herein as a left out-rover. The hook and bait coupled to the out-rover 10 are thus guided by the rudder out and away from the wake of the boat 16 as well as away from any other fishing line trailing the boat 16.

The out-rover device 10 provided in accordance with the invention, as noted above, includes a main body 14 which extends in a longitudinal direction from the leading end or bow 18 to the trailing end or stern. The bow or leading end portion 18 is generally smoothly rounded to hydrodynamically divert water to the right and left or starboard and port sides of the out-rover. Right and left wings 22, 24 extend laterally from the main body 14 to stabilize the out-rover laterally. The wings preferably present hydrodynamically curved leading edges 26, 28, respectively, which guide the water downwardly to provide lift to the out-rover.

The main keel 30 depends downwardly from the main body 14 of the out-rover 10 and is designed to provide laterally stability to the out-rover. The keel 30 is also shaped and sized so as to glide through the water smoothly without generating any substantial turbulence.

In accordance with the invention, as was also noted above, a rudder element 12 depends downwardly from the stern or trailing end portion 20 of the out-rover device 10. The rudder 12 is inclined to the right or to the left of the longitudinal axis of the main body 14 to guide the out-rover 10 to the left or to the right, respectively, of the towing boat 16.

The rudder 12 could be inclined at any angle between about 0° and 90°, particularly depending upon the desired locus of the out-rover 10 during the towing operation. Most preferably, the angle of inclination of the rudder element 12 is about 15° from the longitudinal axis of the main body but even so can vary at least about 5° toward or away from the longitudinal axis of the main body 14 from the angle shown in the illustrated embodiment without departing from the most preferred orientation.

In accordance with the preferred embodiment of the invention, as shown in phantom lines, the rudder element 12 is weighted. In the specifically illustrated embodiment, a flat piece of metal 32, such as lead, is embedded in the rudder.

By way of example, the weight 32 provided in the rudder element 12 is flat, about 1/16th of an inch thick by 2" by 1.5" and weighs about 1.5 ozs. Weighting the rudder element 12 ensures that the out-rover 10 will be stable and keeps the nose of the out-rover 10 inclined upwardly to maintain the out-rover 10 on the water surface.

The wing which is farthest from the wake of the boat 16 is also preferably weighted to counterbalance the tendency of the out-rover 10 to rotate about its longitudinal axis while being towed. Thus, the weighted wing is the right wing 22 for a right out-rover and the left wing 24 for a left out-rover. By way of example, such weighting can be realized by imbedding a weight 34 in the tip of the wing which is adapted to be farthest from the wake.

The outer fin or wingtip weight 34 in the illustrated embodiment is in the form of a conventional barrel shaped sinker which weighs about 1.5 ozs, plus or minus $\frac{1}{2}$ oz, has a length of about 1" and a width of about $\frac{5}{8}$". As noted above, the wingtip weight is used to keep the lure level rather than for encouraging diving to the left or right when being pulled. How the wing is weighted and the particular location, size and shape of the weight, when an imbedded or attached weight is used, of course depends on the dimensions of the out-rover, the inclination of the rudder 12 and the towing speed, in particular.

In accordance with an alternate embodiment of the invention, the weighted wing can be shifted rearwardly which allows the lure to pull out a little steeper, although it also reduces slightly the teasing action of the lure.

In the illustrated embodiment, the upper surface 36 of the out-rover 10 is generally flat with eyelets 38, 40 for receiving a leader 42 as described more particularly below.

The main body 14, wings 22 and 24, keel 30 and rudder 12 may be integrally molded from polyurethane, for example two pound polyurethane or four pound polyurethane. As an alternative to polyurethane resin foam, however, the out-rover 10 can be formed from any suitable lightweight material such as cork, balsam, or the like. Likewise, the out-rover could be formed by interconnecting one or more parts. As an example, the rudder could be detachable or pivotal, for example at its longitudinal midpoint, so that the out-rover could be converted from a right out-rover to a left out-rover and vice versa. In that instance, if a wing is weighted, that weight would have to be selectively movable as well. In addition, other modifications may be made to the details of the out-rover structure to improve appearance or to attract particular types of fish.

The eyelets 38, 40 provided on the flat upper surface 36 of the out-rover lure 10, through which the out-rover leader 42 runs, are positioned at the leading and trailing ends 18, 20 of the main body, respectively. In the illustrated embodiment, the leading eyelet 38 is provided at least about 2½" from the leading end 18 of the out-rover 10 to allow the nose to pull away from the boat 16 independently. On each end of the out-rover leader 42, swivel hook connectors 44 are provided for attaching a leader 46 from the boat 16 and from the fishing tackle (not shown), respectively. The leader 42, which passes through the eyelets on the body, is restricted by enlargements, such as beads 48, so that the out-rover 10 can only slide a limited distance on the leader 42 forward or aft.

In the alternative to the illustrated leader connection system, the out-rover of the invention may be coupled to a towing line extending from the boat 16 and the fishing leader can be detachably coupled to the out-rover so that when a fish takes the bait and becomes hooked on the fishing line, the resistance imposed on the fishing line by the hooked fish causes disengagement of the fishing line from the out-rover device. Such quick disconnect devices for fishing lines are known, generally, in the art of out-rigger and trolling devices and is therefore not illustrated nor described in detail.

As is apparent from the foregoing, the device of the invention is for use off a moving boat and is provided to enable the lure and fishing tackle, that is a hook, bait, line, sinker, etc. to be attached to the out-rover lure and to be trolled behind the boat. The lure device trolls behind the boat and out of the boat's wake or turbulence to the starboard or port side, depending upon the orientation of the tail rudder. In this manner, a single boat can troll multiple lines without risking entanglement. In addition, the body of the out-rover 10 is constructed of a polyurethane resin foam or other suitable sculptable material which is durable and floats on the water. The body is shaped to minimize hydrodynamic resistance while still creating a motion to entice fish while being trolled.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A device for supporting and guiding a fishing line with respect to a towing boat comprising:
    a main body member having a longitudinal axis and leading and trailing end portions;
    first and second wing elements extending laterally from said main body member;
    a keel element extending downwardly from said main body portion;
    a rudder element extending downwardly from said trailing end portion of said main body member, a plane of said rudder element being inclined at an acute angle with respect to said longitudinal axis of said main body portion; and
    means for laterally stabilizing said device during towing including providing a said first wing element which weighs more than said second wing element.

2. A device as in claim 1, wherein said first wing element has a weight element embedded therein whereby it weighs more than said second wing element.

3. A device as in claim 1, wherein an extension of said plane of said rudder element intersects said second wing element.

4. A device as in claim 1, wherein said acute angle is about 15°.

5. A device as in claim 1, wherein said means for laterally stabilizing further comprises a weight element embedded within said rudder element.

6. A device as in claim 1, wherein said main body has a flat upper surface.

7. A device as in claim 6, wherein each of said wing elements has a flat upper surface defined in a plane of said flat upper surface of said main body.

8. A device as in claim 1, further comprising first means for coupling to a towing line and second means for coupling to a fishing line so that when said main body is coupled to a towing line from a vessel, and a fishing line is coupled to said second means for coupling, said fishing line is guided laterally of a towing vessel to one side of the direction of travel of the vessel, out of the wake of that vessel.

9. A device as in claim 1, wherein said leading end portion is hydrodynamically curved and smoothly rounded.

10. A device as in claim 1, wherein said main body member and said wing elements are formed at least in part from balsam.

11. A device as in claim 1, further comprising a leader element coupled to said main body, said leader element having first and second ends, said leader element having first means for coupling to a towing line at one end thereof and second means for coupling to a fishing line at the other end thereof.

12. A device as in claim 12, wherein said leader element is slidably coupled to said main body.

13. A device as in claim 1, wherein said main body member, said wing element, said rudder element and said keel element are integrally formed as a one piece device from a buoyant material.

14. A device as in claim 13, wherein said buoyant material is a synthetic resin.

15. A device as in claim 14, wherein said synthetic resin is polyurethane resin foam.

16. A device as in claim 13, wherein said main body member, said wing elements, said rudder element, and said keel element are integrally molded as a non-hollow structure.

* * * * *